Aug. 29, 1967
N. T. HERMANSEN ET AL
3,338,797
SOLAR POWERED APPARATUS
Filed Oct. 22, 1965
2 Sheets-Sheet 1
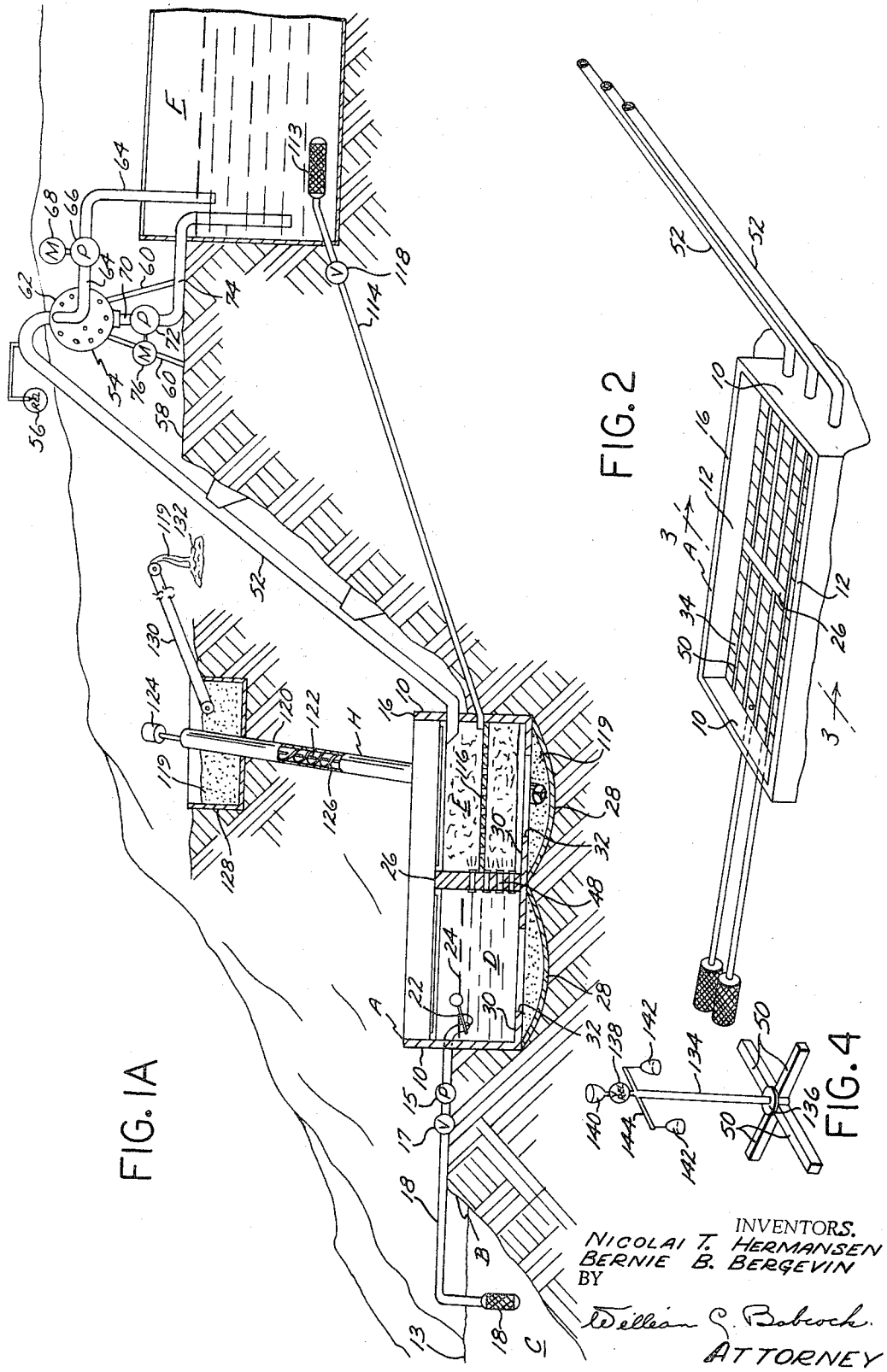
INVENTORS.
NICOLAI T. HERMANSEN
BERNIE B. BERGEVIN
BY
William C. Babcock
ATTORNEY

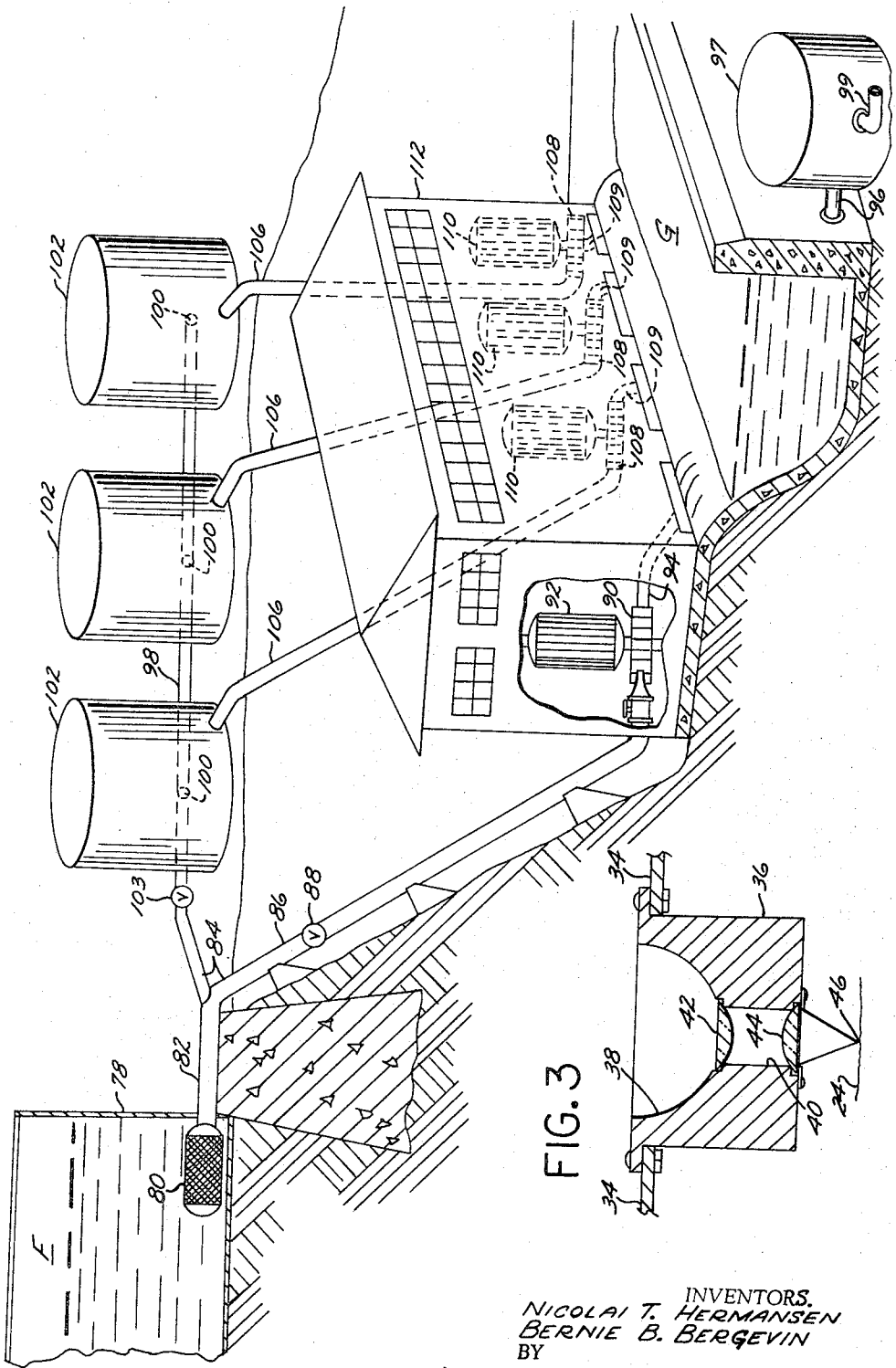

United States Patent Office 3,338,797
Patented Aug. 29, 1967

3,338,797
SOLAR POWERED APPARATUS
Nicolai T. Hermansen, 13860 St. Andrew Drive, Apt. 2-A, Seal Beach, Calif. 90740, and Bernie B. Bergevin, 2626 Palos Verdes Drive N., Rolling Hills, Calif. 90274
Filed Oct. 22, 1965, Ser. No. 500,763
9 Claims. (Cl. 202—234)

The present invention relates generally to an apparatus and method of using same to transform sea water into fresh water by the use of solar energy, as well as generating electrical power from the fresh water prior to the use thereof.

The seas and oceans provide a potential source of inexhaustable water. However, water from such salt water bodies can be used for domestic purposes as well as many industrial processes, only after the dissolved mineral salts have been removed therefrom. Distillation of sea water effectively removes such salts therefrom, but the heat energy required for this operation has, in the past, been so expensive as to preclude large scale commercialization of distillation processes for sea water. For many years solar energy has been considered a potential source of heat energy for transforming sea water into fresh water, but innumerable operational problems have been encountered which to date have not been solved, and prior to the present invention have limited the use of solar energy for sea water distillation purposes to an insignificant extent.

A major object of the present invention is to provide an apparatus and method of using the same, with which sea water is transformed into fresh water by the use of solar energy, with the mineral salts removed from the sea water being transported to a location apart therefrom, for such use as they may subsequently be adapted, and with the fresh water resulting from the operation being used to generate power prior to the utilization thereof for domestic purposes.

Another object of the present invention is to provide an apparatus and method of using the same that will transform sea water into fresh water at a sufficiently low cost as to permit the transformed water to be used for irrigation purposes and reclamation of arid lands which otherwise would be of little or no use.

A still further object of the invention is to provide an apparatus and method that is substantially automatic, and requires a minimum of personnel in the operation thereof.

These and other objects and advantages of the invention will become apparent from the following description thereof, and from the accompanying drawings illustrating the same, in which:

FIGURE 1A is a side elevational view of the first portion of the apparatus of the present invention;

FIGURE 1B is a side elevational view of a second portion of the apparatus;

FIGURE 2 is a perspective view of the salt water warming and steam generating tanks;

FIGURE 3 is a fragmentary vertical cross-sectional view of a portion of the apparatus taken on the line 3—3 of FIGURE 2; and FIGURE 4 is a perspective view of a combined relief valve and light-supporting standard.

With continued reference to the drawings for the general arrangement of the invention, it will be seen in FIGURES 1A and 2 that a rectangular open-topped structure A is located adjacent the shore B of a natural body of saline water C. The structure A is defined by two end walls 10 and two side walls 12 which terminate in upper surfaces 16.

At least one pipe 18 extends through the end wall 10 nearest the body of water C, and a screened inlet 18 is mounted on the left-hand end of this pipe, as illustrated in FIGURE 1A, situated a substantial distance below the surface 13 of the body of water C. A power-driven pump 15 and a valve 17 are located within pipe 18.

Water from the body C thereof is drawn through the screened inlet 20 and pipe 18 by the pump 15 to be discharged into the structure A. The right-hand end of pipe 18 (FIGURE 1A) terminates in a float valve 22, which automatically closes when the liquid level 24 in structure A has risen to a desired elevation therein.

A wall 26 extends between the side walls 12, as best shown in FIGURES 1A and 2, and is equally spaced from the end walls 10. Two concave bottoms 28 extend from the wall 26 to the end walls 10. The end walls 10, side walls 12, wall 26 and bottoms 28 cooperatively define two tanks D and E, best seen in FIGURE 1A. The tanks D and E each are provided with a false bottom 30. A large centrally disposed opening 32 is formed in each bottom 30 through which salt and other crystallized minerals from the sea water may fall downwardly. The tank D serves as a warming tank for the sea water after it has passed into the tank through pipe 18.

The tank E serves as a generating tank to transform the warmed sea water into steam, as will be explained in detail hereinafter.

Although the tanks D and E can be formed from any desired material that is impervious to the action of sea water, it has been found convenient to use concrete in the formation of the end walls 10, side walls 12, wall 26, bottoms 28, and false bottoms 30. In each of the tanks D and E a rigid open lattice work 34 extends between the upper portions of the end walls 10, side walls 12, and wall 26, as can best be seen in FIGURES 1A, 2 and 3.

The openings in the lattice work 34 serve to removably support a number of blocks 36, one of which is shown in detail in FIGURE 3. Each block 36 defines a curved reflector 38 for sunlight, which is in communication with a bore 40 that extends downwardly through the block. First and second lenses 42 and 44 respectively are located in the upper and lower end portions of the bores 40, with the second and lower lens 44 concentrating sunlight gathered by the reflector 38 at a focal point 46. The focal point 46 is at substantially the same elevation as the upper surface of the water level 24 in the tanks D and E. A number of tubular members 48 extend through wall 26 and provide communication between the interior of the tanks D and E. Either hot water or steam can flow from the tank D into the tank E through the tubular members 48.

The open lattice work 34 also serves as a support for a number of walkways 50, as may best be seen in FIGURE 2. A number of pipes 52 are connected to the upper interior portion of tank E, as may best be seen in FIGURE 1A, which pipes extend upwardly and are in communication with a condenser 54. A relief valve 56 is provided at the upper extremity of each pipe 52, and the condenser 54 is preferably supported above the earth's surface 58 on legs 60, or other suitable framework. The condenser 54 is of conventional design, and includes an outer cylindrical shell 62 through which a number of cooling pipes 64 extend.

A tank F is provided, which serves to hold the fresh water resulting from condensation of the steam that passes upwardly through the pipes 52 to the condenser 54. Cooling water from tank F is drawn upwardly through a pipe 64 due to the action of a pump 66 adapted to be operated by any conventional type of prime mover 68.

After the cooling water in pipes 64 is heated by the steam, it is discharged back into the tank F through a conduit (not shown). Steam entering the confines of shell 62 from the pipes 52 contacts the exterior surfaces of the cooling pipes 64, condenses and flows downwardly as fresh water into a pipe 70 that is preferably connected to the inlet of a pump 72, from which pump the fresh water is discharged through a pipe 74 into the tank F. Pump 72 is driven by an electric motor 76, or other conventional prime mover (not shown).

One end of tank F, as may best be seen in FIGURE 1B, is defined by a wall 78. A screened water inlet 80 is preferably located adjacent the wall 78, and connected to a pipe 82 that leads to a Y connection 84. One branch of connection 84 is joined to a downwardly extending pipe 86 with which a valve 88 is associated.

When the valve 88 is in the open position, water can flow downwardly due to the force of gravity through the pipe 86 to discharge into a turbine 90 to drive an electrical generator 92 that supplies electrical energy for domestic and commercial purposes. Water is discharged from the turbine 90 through a pipe 94 to a reservoir G, which is preferably located at a sufficiently high elevation on the terrain surrounding the installation as a whole that water can gravitate from the reservoir through a pipe 96 into a closed tank 97. Water can flow from tank 97 through a pipe 99 to a city or industrial installation (not shown) for commercial or domestic use.

The Y fitting or connection 84 is also connected to a header 98 provided with a number of laterals 100 that are in communication with the interior of a number of water storage tanks 102, as best seen in FIGURE 1B. A valve 103 is installed in header 98. When valve 88 is closed and valve 103 opened, water can flow from the tank F into storage tanks 102 provided for this purpose. A pipe 106 leads from the lower interior of each of the tanks 102 and is adapted to direct water from these tanks to turbines 108, which drive electrical generators 110. Conduits 109 extend from turbines 108 through which water discharges into the reservoir G in the same manner described in connection with the turbine 90.

The turbines 90 and 108, as well as the electrical generators 92 and 110, are preferably situated in a suitable building or shelter 112 (FIGURE 1B) to protect them from the weather. A screened inlet 113 is located in tank F, which inlet is connected to a pipe 114 that extends downwardly to the interior of the second tank E to terminate above a perforated plate 116 that extends across the interior thereof, as best seen in FIGURE 1A. The pipe 114 is provided with a valve 118, which when open, permits water to gravitate downwardly through pipe 114 into the confines of the tank E.

As sea water from the body C thereof is evaporated in the tanks D and E and transformed into steam therein, the solid dissolved materials such as salt will tend to crystallize out and fall through the openings 32 to come to rest on the bottoms 28. Salt 119 is removed from tank E by a conveyor H, preferably of the screw type.

The conveyor H includes an upwardly extending cylindrical shell 120 that extends into the tank E, and the lower end thereof is disposed in the space between the bottom 28 and false bottom 30 thereof. A shaft 122 is rotatably supported in shell 120 by conventional means (not shown), and is driven by a prime mover 124 (FIGURE 1A). The shaft 122 supports a screw 126, the outer edge of which is disposed adjacent the interior surface of shell 120. When the prime mover 124 is actuated, the screw 126 is rotated and salt 119 is moved upwardly from tank E to be discharged into a salt box 128. An endless power-driven belt conveyor 130 transports salt 119 from box 128 to a desired location 132.

To prevent excessive build-up of steam pressure in the tanks D and E, a number of vertical tubular uprights 134 are provided, one of which is shown in FIGURE 4. The interior of each upright 134 is in communication with the interior of tank E. Each upright 134 is supported from a walkway 50 by a base 136, or the like. A pressure relief valve 138 is mounted on the upper end of each upright 134, and when open, discharges steam through a conical shield 140. Shield 140 prevents hot condensate from the escaping steam from dropping down onto the walkways 50. Incandescent lamps 142, or other lighting means, can be supported by cross pieces 144 from the uprights 134.

The use and operation of the invention are relatively simple. In FIGURE 2 of the drawings, but one unit of the apparatus of the present invention is shown. However, a plurality of units may be disposed in side-by-side relationship, with the number of units employed being dependent upon the quantity of fresh water desired and the amount of electrical energy it is desired to generate.

The tanks D and E in each of the structures are located adjacent the body of water C so that water therefrom may be discharged through the pipe 18. Discharge of water through pipe 18 is effected by means of the pump 15. On the other hand, if the tanks D and E are appropriately located relative to the body of water C, the fluid flow may be governed by gravity.

The float valve 22 automatically maintains the liquid level 24 of the water in the tanks D and E at a fixed elevation therein. After the water has entered tank D, it is subjected to the heating action of the solar rays, which are concentrated at a plurality of focal points or areas 46, as shown in FIGURE 3. The water in tank D is heated, and flows into the tank E through the tubular members 48.

After entering tank E, the heated water is subjected to further heat from the solar rays sufficient to transform it into steam which escapes upwardly through the pipes 52 to discharge into the confines of condenser 54. The steam in condenser 54 is reduced to water, and is discharged therefrom through the pipes 70 and 74 into the first tank F.

Water may then discharge from the tank F through the pipes 86 and 98 to be used for power generation means as previously explained, and after being used for this purpose it is discharged into reservoir G. From reservoir G the water is withdrawn through the pipe 96 by force of gravity to pass into tank 97, from which it may be drawn through pipe 99 for domestic uses or such other uses as may be desired. The water in tank F, as can be seen in FIGURE 1A, may be used for cooling pipe 64 of the condenser 54, and then discharged back into tank F. The tanks 102 permit large quantities of fresh water to be stored, ready for use in generating power, if the liquid level in tank F drops to an unduly low elevation.

The mineral salts that crystallize out during the operation of the present invention are removed from tank E by means of conveyor H, as previously explained in detail and as illustrated in the drawings, whereby the description thereof is unnecessary.

Although the invention herein shown and described is fully capable of achieving the objects and providing the advantages hereinbefore mentioned, it is to be understood that it is merely illustrative of the presently preferred embodiment thereof, and that we do not mean to be limited to the details of construction herein shown and described other than as defined in the appended claims.

We claim:

1. Apparatus for transforming saline water into fresh water by solar energy and for generating electrical power from said fresh water prior to the use thereof, including:
   (a) a rectangular structure, open at the top, situated adjacent a body of said saline water;
   (b) a wall that subdivides said structure into a water warming tank and a steam generating tank;
   (c) first means for discharging saline water from said body of water into said warming tank;
   (d) open lattice work horizontally supported on the upper portion of said structure;
   (e) second means for holding the liquid level of said saline water at a substantially constant elevation in said warming tank;

(f) third means in said wall for maintaining communication between said warming tank and said steam generating tank;

(g) fourth means supported by said lattice work for concentrating solar energy to heat said water in said warming tank and said steam generating tank sufficient to transform said saline water into steam, which lattice work and fourth means cooperatively seal the upper portions of said warming and steam generating tanks;

(h) fifth means for removing salt from said steam generating tank which crystallizes out of said saline water as it is transformed into steam;

(i) an upwardly extending pipe connected to the interior of said steam generating tank;

(j) sixth means connected to the upper end of said pipe for condensing steam discharging therefrom into fresh water;

(k) a first enclosed tank;

(l) seventh means for discharging water from said condenser into said first tank;

(m) a turbine located a substantial distance below said first tank;

(n) a conduit for discharging fresh water from said first tank into said turbine to rotate the same;

(o) electrical power generating means driven by said turbine;

(p) a reservoir into which fresh water from said turbine discharges;

(q) a second closed tank located below said reservoir;

(r) a conduit connecting said reservoir to said second tank; and (s) a pipe extending from said second tank for distributing said fresh water to users thereof.

2. A device as defined in claim 1 wherein said first means comprises:

(t) a screened water inlet disposed below the surface of said body;

(u) a pipe connected to said inlet and to the interior of said warming tank; and (v) a power-driven pump connected to said pipe for drawing said saline water through said inlet and discharging the same into said warming tank.

3. A device is defined in claim 2 wherein said second means comprises a float valve located in said warming tank and connected to the end of said pipe in communication therewith.

4. A device as defined in claim 2 wherein said third means comprises at elast one tube that extends through said wall.

5. A device as defined in claim 2 wherein said fourth means comprises:

(t) a plurality of blocks removably supported in said lattice work, each of which blocks includes a concave solar light reflector defined in the upper portion thereof, with a bore extending downwardly therefrom; and (u) lens means in said bores for focusing sunlight onto the surface of said saline water in said warming and steam generating tanks.

6. A device as defined in claim 2 wherein said fifth means comprises.

(t) a cylindrical shell in communication with the lower interior portion of said steam generating tank and extending upwardly therefrom;

(u) a screw rotatably supported in said shell;

(v) power means for rotating said screw;

(w) a salt box into which salt is discharged from the upper end of said shell as said screw is rotated; and (x) power-driven conveyor means for transporting salt from said box to a location apart therefrom.

7. A device as defined in claim 2 wherein said sixth means comprises:

(t) a shell that defines a confined space therein which is in communication with said pipe that extends from said steam generating tank, which shell has an opening formed in the lower portion thereof;

(u) a plurality of cooling tubes in said shell for condensing steam into fresh water;

(v) pump means for circulating fresh water from said first tank through said cooling tubes and returning same to said first tank; and (w) a conduit connected to said opening in said shell to the interior of said first tank through which said fresh water condensed from said steam can flow.

8. A device as defined in claim 2 which further includes a plurality of elongate walkways supported on said lattice work.

9. A device as defined in claim 8 which further includes:

(t) a plurality of tubular uprights supported from said walkways, with each of said uprights being in communication with the interior of said steam generating tank;

(u) a plurality of relief valves mounted on the upper ends of said uprights;

(v) a plurality of shields mounted on the upper ends of said uprights for preventing hot condensate that discharges from said uprights from dropping onto said walkways; and (w) electrical lighting means supported from said uprights.

References Cited

UNITED STATES PATENTS

| | | |
|---|---|---|
| 1,253,203 | 1/1918 | Battey. |
| 1,544,029 | 6/1925 | Nelson _____ 203—10 |
| 3,232,846 | 2/1966 | Kimmerle _____ 202—234 |
| 3,290,229 | 12/1966 | Brown _____ 203—11 X |

NORMAN YUDKOFF, *Primary Examiner.*

D. EDWARDS, *Assistant Examiner.*